No. 781,928. PATENTED FEB. 7, 1905.
A. ANDERSON.
POTATO DIGGER.
APPLICATION FILED APR. 20, 1904.
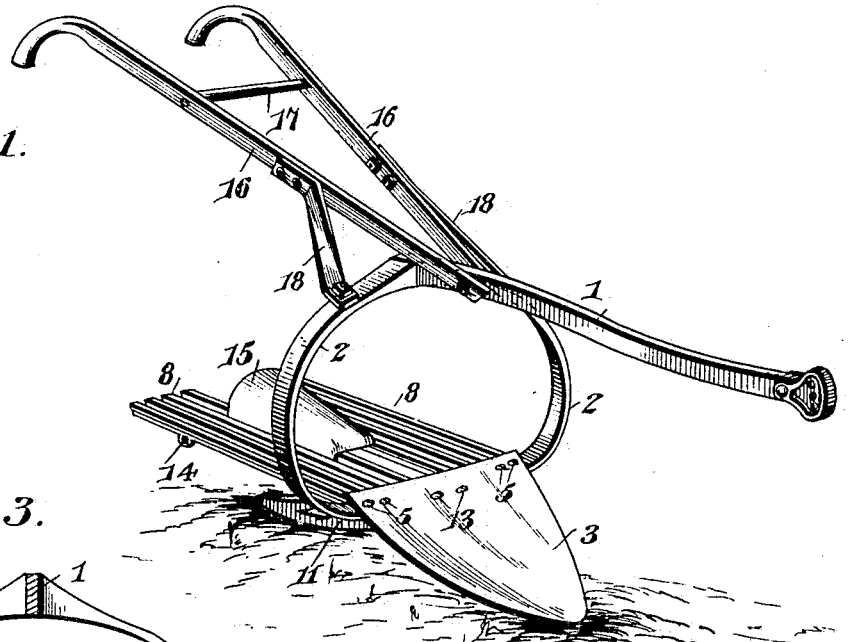
Fig. 1.
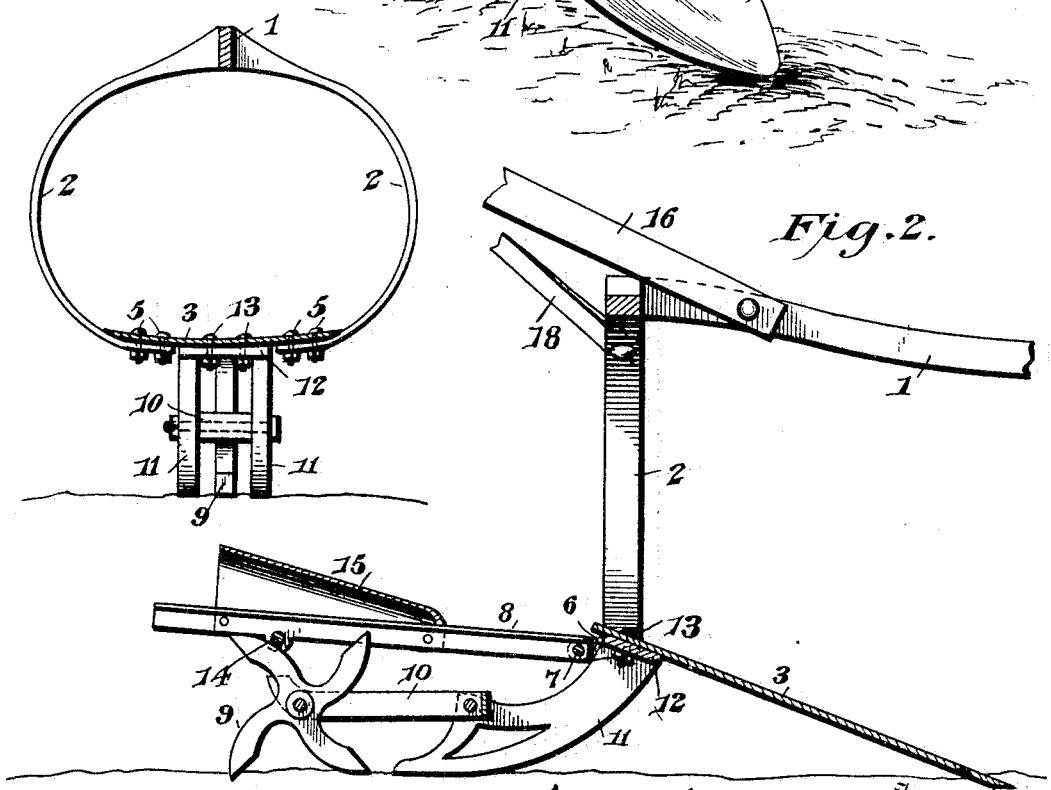
Fig. 3.
Fig. 2.
August Anderson, Inventor
Witnesses No. 781,928. Patented February 7, 1905.

UNITED STATES PATENT OFFICE.

AUGUST ANDERSON, OF NELSON, MINNESOTA.

POTATO-DIGGER.

SPECIFICATION forming part of Letters Patent No. 781,928, dated February 7, 1905.

Application filed April 20, 1904. Serial No. 204,062.

*To all whom it may concern:*

Be it known that I, AUGUST ANDERSON, a citizen of the United States, residing at Nelson, in the county of Douglas and State of Minnesota, have invented a new and useful Potato-Digger, of which the following is a specification.

The invention relates to potato-diggers.

The object of the present invention is to improve the construction of potato-diggers and to increase their efficiency and lighten the draft, and thereby render them more easy of operation.

A further object of the invention is to provide a potato-digger which will be simple and comparatively inexpensive in construction and which will possess great strength and durability.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a potato-digger constructed in accordance with this this invention. Fig. 2 is a longitudinal sectional view. Fig. 3 is a transverse sectional view.

Like numerals of reference designate corresponding parts in all the figures of the drawings.

1 designates a draft-beam provided at its rear end with integral oppositely-disposed laterally-bowed standards or arms 2, preferably thickened adjacent to the rear end of the beam 1 and having their lower terminals located in the same transverse plane as their upper ends. The bowed arms or standards present inner concaved faces and form an enlarged opening for permitting potatoes and soil to pass readily from the shovel or moldboard 3 to the shaker. The unobstructed passage afforded by this construction prevents vines and weeds from clogging the potato-digger and increasing the draft thereof. The draft of the potato-digger is thereby greatly lightened, whereby it is rendered easy of operation. The arms or standards which depend from the beam are approximately semicircular, and their upright portions are located a considerable distance beyond the plane of the shovel or moldboard. The lower ends of the arms or standards 2 extend beneath the rear end of the shovel or moldboard 3 and are secured to the lower face of the same at the rear end thereof by fastening devices 5.

The arms are preferably provided at their lower terminals with rearwardly-extending lugs or ears 6, which are pierced by a pintle-rod 7, that hinges a shaker 8 to the shovel or moldboard 3. The shaker consists of a series of fingers, and it is operated by a wheel 9, arranged to run in the bottom of a furrow and connected by a link 10 with runners 11. The link 10 is approximately U-shaped, being composed of two sides and a front transverse connecting portion. The runners 11, which are connected by a transverse end portion 12, are secured to the shovel or moldboard by fastening devices 13 and are arranged between the lower ends of the laterally-bowed arms. The shaker is provided with a rod 14 for engagement with the wheel, and it has a guard 15 located above the wheel.

The potato-digger is provided with handle-bars 16, terminating at their upper ends in suitable handles and connected by a rung 17. The lower ends of the handle-bars are secured to the beam 1 at opposite sides thereof, and suitable braces 18 extend from the arms or standards 2 to the handle-bars for supporting the latter. The braces 18 extend upward and rearward from the arms or standards and are secured to the handle-bars near the centers thereof.

The potato-digger operates in the ordinary manner to dig potatoes, which, with the soil, pass rearward to the shaker. The shaker, which is vibrated by the wheel, is adapted to thoroughly sift the soil and loosen the potatoes.

Having thus fully described my invention, what I claim as new, and desire to secure by Letters Patent, is—

1. In a potato-digger, comprising a beam provided with a pair of transversely-bowed depending arms having their lower terminals spaced apart, a shovel extending forwardly from the lower ends of the said arms, a shaker extending rearwardly from the lower ends of the arms and supported by the same, a runner arranged in the space between the lower ends of the arms, and means carried by the runner for operating the shaker.

2. A potato-digger, comprising a shovel, a beam provided at its rear end with a pair of transversely-bowed depending arms or standards, having their lower terminals arranged in the same transverse plane as their upper terminals and extended beneath the shovel and secured to the rear end of the same at opposite sides thereof, said lower ends being spaced apart and provided with rearwardly-extending lugs, a shaker supported by the lugs, a runner arranged in the space between the lower ends of the arms or standards, and means carried by the runner for operating the shaker, substantially as described.

In testimony that I claim the foregoing as my own I have hereto affixed my signature in the presence of two witnesses.

AUGUST ANDERSON.

Witnesses:
C. H. LARSON,
G. A. FORSGREN.